(No Model.)
E. M. LUNDHOLM.
STERILIZER FOR SURGICAL INSTRUMENTS, &c.
No. 553,561. Patented Jan. 28, 1896.
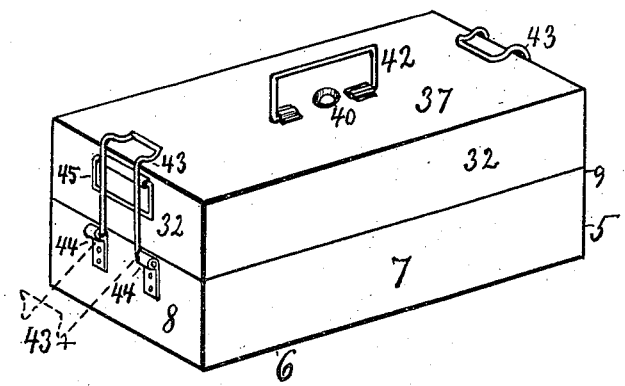
Fig: 1.
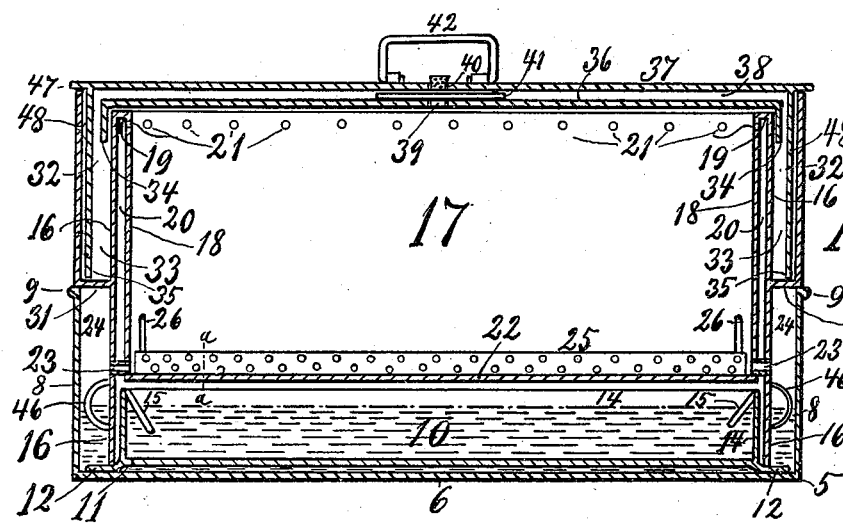
Fig: 2.
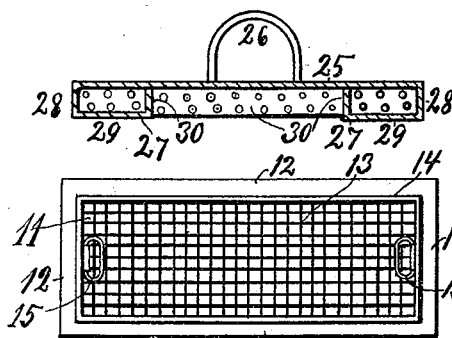
Fig: 3.
Fig: 4.
WITNESSES:
P. C. Carlsen
J. E. Carlsen
INVENTOR:
Erik M. Lundholm
BY his ATTORNEY:
A. M. Carlsen

UNITED STATES PATENT OFFICE.

ERIK M. LUNDHOLM, OF ST. PAUL, MINNESOTA.

STERILIZER FOR SURGICAL INSTRUMENTS, &c.

SPECIFICATION forming part of Letters Patent No. 553,561, dated January 28, 1896.

Application filed June 29, 1895. Serial No. 554,421. (No model.)

*To all whom it may concern:*

Be it known that I, ERIK M. LUNDHOLM, a subject of the King of Sweden and Norway, residing at St. Paul, in the county of Ramsey and State of Minnesota, have invented certain new and useful Improvements in Sterilizers for Surgical Instruments and Dressings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in sterilizers for surgical dressings and instruments, &c.

The objects of my invention are, first, to combine in one handy sterilizing apparatus an instrument-boiler or sterilizing-chamber for surgical instruments, and another chamber in which surgical dressings may be sterilized by the hot steam generated in the instrument-boiler; second, to make the said two compartments separable and serviceable independent of each other when there is no use for both of them at one time; third, to provide a sterilizer in which the steam is protected by an idle steam-space around it and is thus kept at a high temperature and prevented from condensation by contact with a single thin wall, the outside of which is exposed to the cooling influence of the atmosphere, as is usually the case in ordinary sterilizers; fourth, to provide a combined sterilizer for surgical instruments and dressings of such construction that it may readily be carried in the hand and be placed on any ordinary cooking-stove, kerosene or gasoline stove, &c., for boiling the water in it, and is thus especially adapted for use by physicians in the country and in the army, &c.

The above and other objects I attain by the novel construction and arrangement of parts illustrated in the accompanying drawings, in which—

Figure 1 is a perspective view of my complete sterilizer. Fig. 2 is a longitudinal vertical substantially central sectional view of Fig. 1, with the false bottom 25 not shown in section. Fig. 3 is a transverse sectional view of the false bottom 25 as on line *a a* in Fig. 2. Fig. 4 is a top plan view of the pan in which the instruments are put and placed into the water-boiler for sterilization.

Referring to the various parts by reference-numerals, 5 designates the water vessel or boiler, of which 6 is the bottom, 7 the side walls and 8 the end walls, of which latter the upper edges 9 may be formed into a stiffening-rim, as shown in Fig. 2. 10 designates the water to be boiled in said vessel. In this water is placed, upon the bottom 6, the instrument-holding pan 11, which is guided into its central position by the flanges 12, by which it is provided. The bottom 13 of this pan may be of perforated sheet metal or of wire-cloth, as shown in Fig. 4, and the sides may be of the same material. The walls 14 of the pan are provided at their upper edges with two oppositely-located and inwardly-folding handles 15, by which the pan is lifted and handled.

Surrounding the pan 11 and standing upon the flanges 12 thereof are the outer walls 16 of the sterilizing-vessel 17, which consists of the said wall 16 and the inner wall 18 secured together, preferably at the top edge 19 thereof, with an intervening steam-space 20, which communicates with the interior of the vessel 17 by means of the steam-inlet holes 21. It further consists of the bottom 22, close above which I provide the two substantially horizontal steam-exhaust ducts 23, by which the steam, after being used in the vessel 17, may pass into the space 24, where it will be condensed by contact with the single walls 7 and 8, and thus re-enter the water in the boiler or vessel 5.

If the boiler is placed on a big cooking-stove or otherwise heated so much that the water directly below the condensing-space 24 will not permit all of the steam to condense, then the surplus steam may escape over the edge 9 of the vessel 5; but ordinarily this will not take place, as the water-vessel is usually heated mostly in the middle of its bottom by a kerosene-stove, leaving the water in the condensing-space 24 at a temperature below the boiling-point, and the communication and circulation between this water and the boiling water 10 are so much obstructed by the walls 16 that the boiling heat cannot be transmitted from the latter to the former.

Upon the bottom 22 I place a false bottom 25, upon which the things to be sterilized with steam—such as bottles, bandages, surgical dressings, &c.—are supported in the steam chamber or vessel 17. This false bottom 25 is provided with the lifting-handles 26, and is preferably made of perforated sheet metal or wire-cloth and formed in the shape shown in Fig. 3, so that the supporting bars or ribs 27 are formed integral with the bottom by bending its outer edges downward, as 28, inward, as 29, and upward, as 30. Around the upper half of the sterilizing-vessel 17 I provide a water-pocket 33, consisting of the bottom 31 and the outer wall 32, which combined with the upper part of the wall 16, to which said bottom 31 is secured, form the space or pocket 33, in which water (not shown) is kept for the purpose of making the covers 36 and 37, by which the apparatus is covered, fit steam-tight by letting their lower edges 34 and 35 down into said water. Between said covers is a dead-steam space 38, and both covers are provided with central holes 39 and 40 for introducing a thermometer, and with the foldable handles 41 and 42.

43 are clasps hinged at 44 to the end walls of the lower vessel 5, and with their upper and hook-shaped ends grab tightly over the ends of the upper cover 37, thereby holding the two vessels and covers together, so that they may be carried like a satchel by the handle 42, and when the clasps 43 are thrown back into the position shown in dotted lines 43× in Fig. 1, the vessels, covers, and bottoms, &c., are free to be separated.

45 are handles by which to lift the vessel 17, while the spring-clasps 43 serve as handles for lifting the vessel 5.

46 are guides provided upon the outer sides of the lower portions of the walls 16 for guiding the vessel 17 into a central position relatively to the lower vessel 5, so that the outer wall 8 of the latter and the wall 32 may appear even at the outside.

In operation if there are instruments and dressings to be sterilized at one time the instruments are placed in the pan 11 and the dressings in the vessel 17 upon the partly-elevated false bottom 25. Water is put in the boiler 5 about as high as shown, and the apparatus is put together, as shown in Figs. 1 and 2, and placed on the stove or over a flame or fire to cause the water 10 to boil. A little water may also be put in the pocket 33, although the latter will soon fill up with water condensed from the steam.

The holes 39 and 40 are filled with stoppers, preferably of cotton or similar loose material, through which a thermometer may be inserted. Such stoppers also prevent impurities from entering the sterilizing-chamber. When the water 10 boils, the steam generated thereby passes up through the space 20, in through the holes 21, down through the dressing materials in the vessel 17, and through the perforated bottom 25, below which it escapes out through the ducts 23 into the condensing chamber or space 24, where it is in ordinary cases reduced to water which communicates with the water 10 below the lower edges of the walls 16. The surplus steam, if any there be, escapes between the edges 9 of the water-vessel and the outer edges of the bottom 31. If there are no instruments to be boiled, the pan 11 may be left out of the apparatus, and if there are instruments only and no dressing materials to be sterilized then the vessel 17 is put one side and the upper cover 37 is placed with its edges down in the water in the condensing-space 24, and its upper flange or edge 47 resting upon the edge 9 of the boiler or vessel 5, in which case there will be a steam-space between the depending walls 35 of the cover 37 and the walls 7 and 8 of the water-vessel, and the steam, if any must escape, passes up through the hole or porous stopper in the center of the cover. It will thus be seen that my apparatus is adapted to be used as a combined instrument-boiler and steam-sterilizer, and may be used for either or both of said purposes. It may also be used separately for one of the said purposes, and in either case the live steam is easily kept at a high temperature by having it surrounded by the dead-steam spaces 38 between the tops of the two covers, the space 48 between the walls of the upper cover and the wall 32 or 8, as the case may be, the water-pocket 33 and the condensing-space 24, so that the sterilizer is very efficient, owing to an easily obtained and retained high temperature in the sterilizing-chambers, and it is also economical in respect of saving fuel and time by using the same fuel and time for boiling the instruments and sterilizing the dressing materials.

It will be understood that the main features of my sterilizing apparatus may be employed in sterilizing also other materials and articles than those hereinabove described, in the surgical profession, for which my apparatus in its present form is especially adapted.

Having thus described my invention, what I claim, and desire to secure by Letters Patent, is—

1. A sterilizing apparatus comprising a water vessel as 5, a supporting pan as 11, having a skeleton bottom and being adapted to stand in the water vessel with the articles in it to be sterilized by boiling in the water; a double-walled sterilizing vessel as 17, supported with its bottom and inner wall above the water and having its outer wall extended from the top of the inner wall down, substantially to the bottom of the water vessel, between the walls of the latter and of the pan 11, the steam space 20, between said double wall, the holes 21, provided in the inner wall near its upper edge, the perforated false bottom 25, contained within the chamber 17, the steam ducts 23, penetrating the double wall at a height between the false bottom 25, and the real bottom 22, of the sterilizing chamber 17, and a suitable steam tight cover, covering said chamber, substantially as and for the purpose specified.

2. In a sterilizing apparatus the combination of the water vessel 5, and the sterilizing pan 11, loosely placed therein, the steam sterilizing vessel 17, supported above the water in the water vessel, and having the depending outer wall 16, and around its upper portion the outwardly projecting water pocket 33, substantially of the same depth, length and width as the water vessel 5, upon the upper edge of which the bottom of the said pocket touches, the condensing space 24, formed thereby and by the wall 16, the steam ducts 20, 21, and 23, leading from the water vessel through the steam sterilizer and into the condensing chamber 24, the hinged clasping hooks 43, secured to the water vessel and grabbing over the top of the upper cover 37, said cover being also adapted for use on the water vessel alone when the vessel 17 is removed and remains covered only by its cover 36; and suitable handles for lifting the various parts of the apparatus, substantially as shown and described.

In testimony whereof I affix my signature in presence of two witnesses.

ERIK M. LUNDHOLM.

Witnesses:
CARL EKMAN,
A. SOFFT.